Oct. 4, 1966   E. C. HERBKERSMAN   3,276,052
CLUTCH MEANS ENGAGING ROTARY TOOL SPINDLE AND ROTARY FEED
SCREW IN A SINGLE RELATIVE ANGULAR POSITION
Original Filed Jan. 2, 1962                6 Sheets-Sheet 6
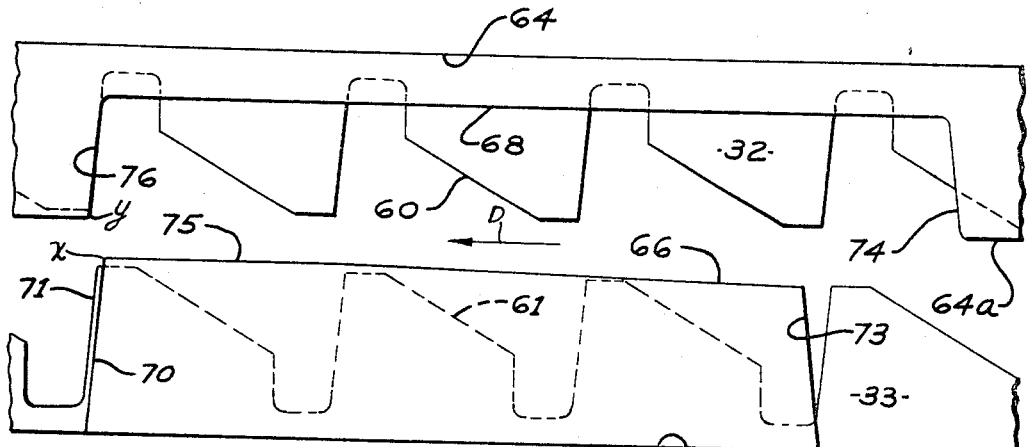
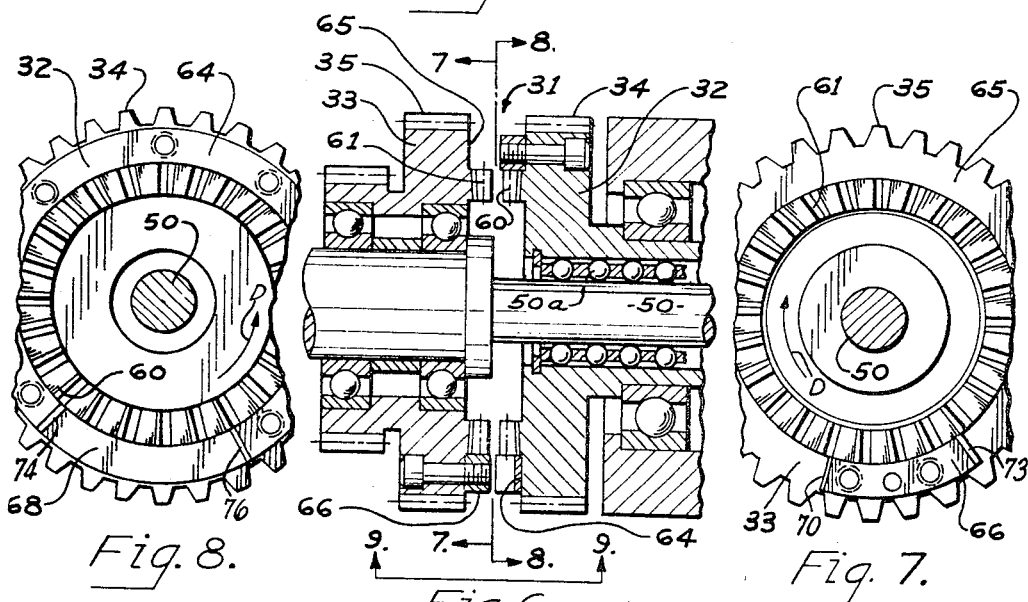
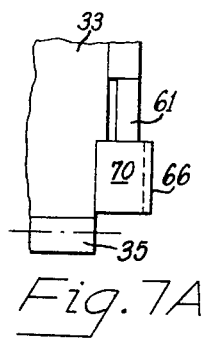
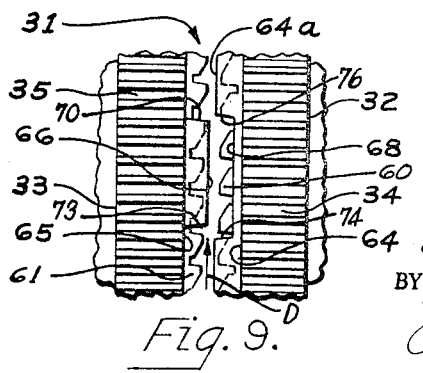
INVENTOR.
Earle C. Herbkersman,
BY
John H. Leonard,
his ATTORNEY.

United States Patent Office

3,276,052
Patented Oct. 4, 1966

3,276,052
CLUTCH MEANS ENGAGING ROTARY TOOL SPINDLE AND ROTARY FEED SCREW IN A SINGLE RELATIVE ANGULAR POSITION
Earle C. Herbkersman, Parma, Ohio, assignor to The Pipe Machinery Company, Wickliffe, Ohio, a corporation of Ohio
Original application Jan. 2, 1962, Ser. No. 162,932, now Patent No. 3,224,535, dated Dec. 21, 1965. Divided and this application Sept. 21, 1965, Ser. No. 505,084
1 Claim. (Cl. 10—105)

This is a division of application Serial No. 162,932, filed January 2, 1962, now Patent No. 3,224,535, issued December 21, 1965.

This invention relates to a pilot clutch, and particularly to a multi-tooth pilot clutch of which the engageable parts can re-engage only in the exactly relatively rotated position about their axis in which they were at the instant of disengagement.

For purposes of illustration, the clutch is described as applied to a threading machine of the general character disclosed in United States Letters Patent No. 2,679,057, of Neil T. Sawdey, issued May 25, 1954, its use for other purposes being readily apparent from the illustrative example.

In general, in the pipe cutting machine therein disclosed, a rotatable chaser carrying spindle head is advanced in coaxial relation toward, and retracted from, a pipe coupling held in a chuck. The spindle is rotated by a gear train. The feed screw is connected to the gear train by auxiliary gears and a pilot clutch so that the feed screw is driven in timed relation to the rotation of the spindle head for advancing the spindle head. The screw is driven by other means for returning the spindle to starting position while the clutch is disengaged.

In some machining operations, such as threading of pipe couplings from opposite ends, it is desirable that the circumferential position of the chaser in relation to its advanced position axially of the coupling be at all times the same so that the operations can be duplicated precisely on succeeding couplings. This is particularly true in threading pipe couplings from opposite ends to an extent such that the threads meet at the longitudinal center of the coupling. If accuracy in relation of advanced and rotated positions of the chaser is maintained, the innermost end of the thread from one end will meet precisely the innermost end of the thread from the opposite end, whereby the chaser forming the later formed thread will not overrun and mutilate the already formed thread from the opposite end at completion of the threading operation. To assure that the circumferential position of the chaser or cutting tool in relation to its advanced position is always the same, the clutch of the present invention is interposed in the driving train between the spindle head and the feed screw for driving the screw on the feeding or advancing stroke.

If tapered threads are to be cut, the advance and retraction of the chasers relative to the axis of the threads is controlled by a suitable sine bar in a manner disclosed in the above patent. This mechanism does not change the operative interrelations of the spindle head, clutch, and feed screw.

To duplicate the threading operation exactly so that the tool starts precisely in the same rotated position in relation to the rotated position of the feed screw, the present clutch is arranged so that it re-engages in one predetermined relative rotated position of the feed screw and clutch, and hence of the feed screw and spindle head. Specifically, one clutch member is always restored to the same rotated starting position, and the clutch is operative to cause re-engagement only when the spindle is in the same rotated position at the beginning of a cutting cycle.

The clutch is, therefore, a one-position clutch in that the two clutch members can drive only when the teeth are fully engaged and the teeth can fully engage in only one relatively rotated position of the clutch members.

Various other objects and advantages of the present invention will become apparent from the following description wherein reference is made to the drawings, in which:

FIG. 6 is an enlarged sectional view of a portion of the clutch as illustrated in FIG. 3;

FIG. 7 is an enlarged view of the driven member of the clutch when viewed as indicated by the line 7—7 in FIG. 6;

FIG. 7A is an enlarged fragmentary view of one of the clutch members, as viewed from the left in FIG. 7, showing the holdout member of the clutch as viewed from its leading end;

FIG. 8 is a plan view of the other member of the clutch, viewed as indicated by the line 8—8 in FIG. 6;

FIG. 9 is a front elevation of the periphery of the clutch, as viewed from line 9—9 in FIG. 6, showing the manner for engagement of the driving and driven members thereof; and FIG. 10 is an enlarged view similar to FIG. 9 showing the manner of engagement and disengagement of parts of the clutch.

Figure 1:
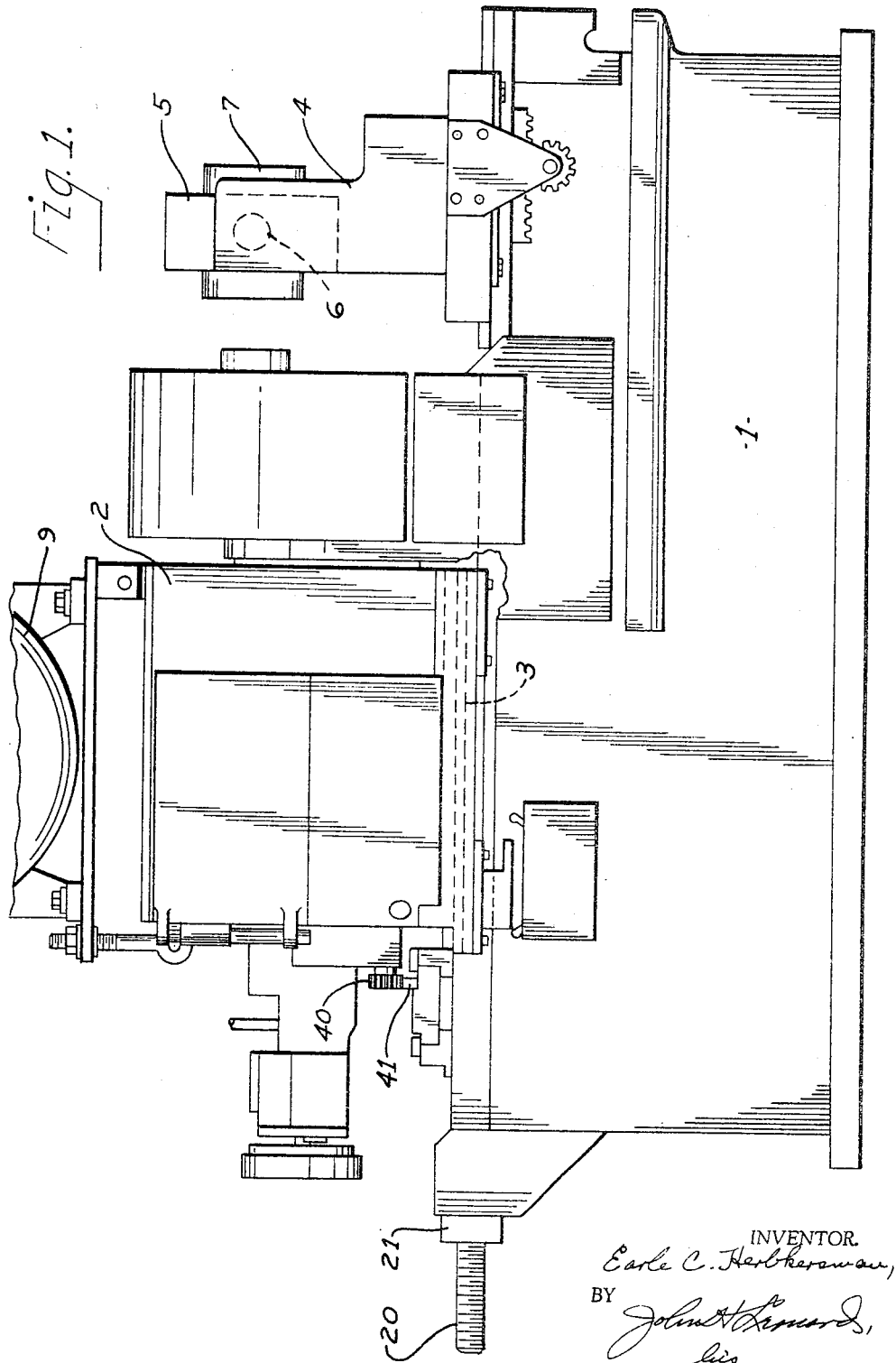
FIG. 1 is a side elevation of the screw threading machine arranged for threading a pipe coupling from opposite ends, successively, and in which the clutch of the present invention is incorporated.
Figure 2:
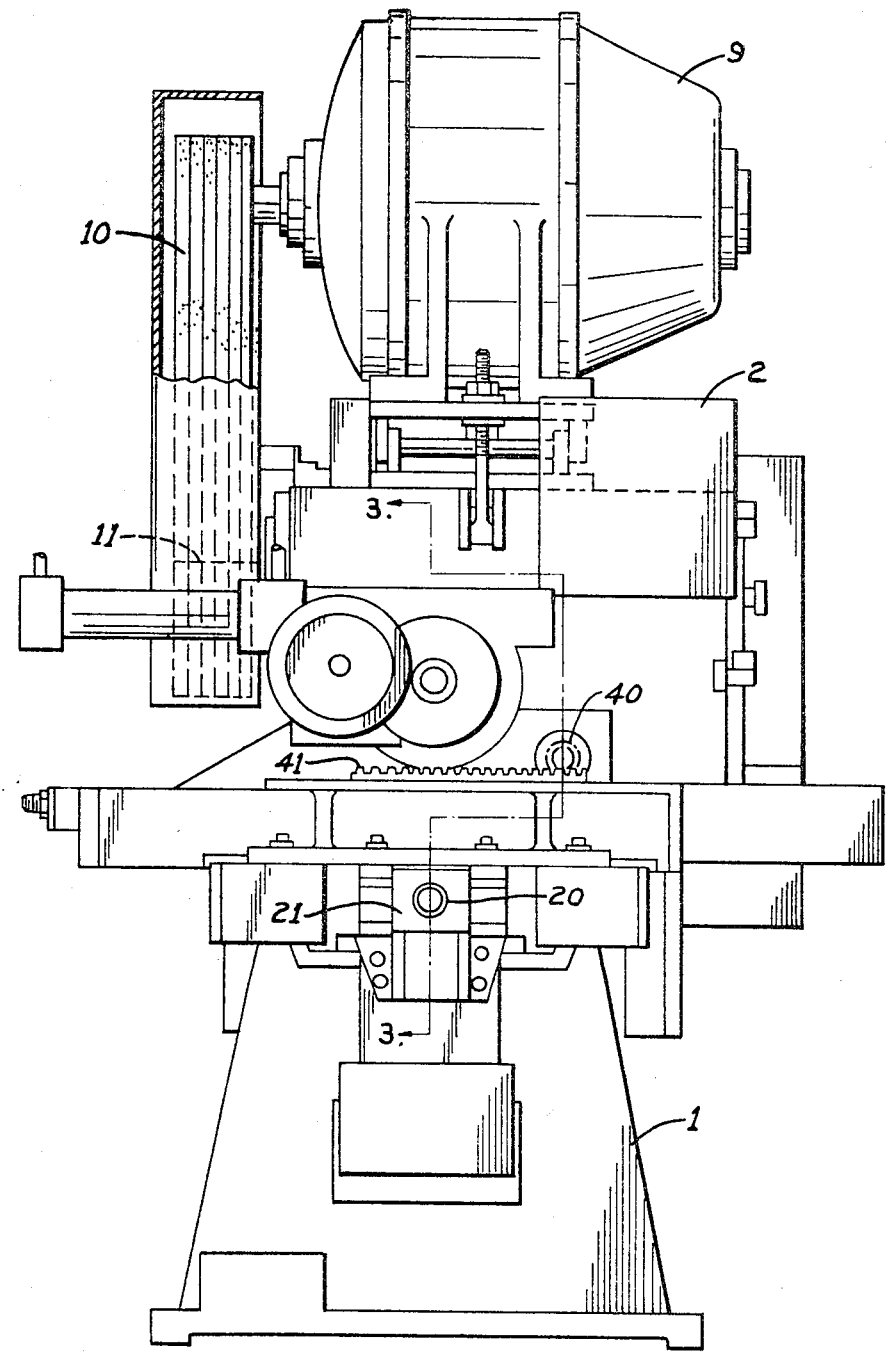
FIG. 2 is a rear end elevation of the machine illustrated in FIG.1.
Figure 4:
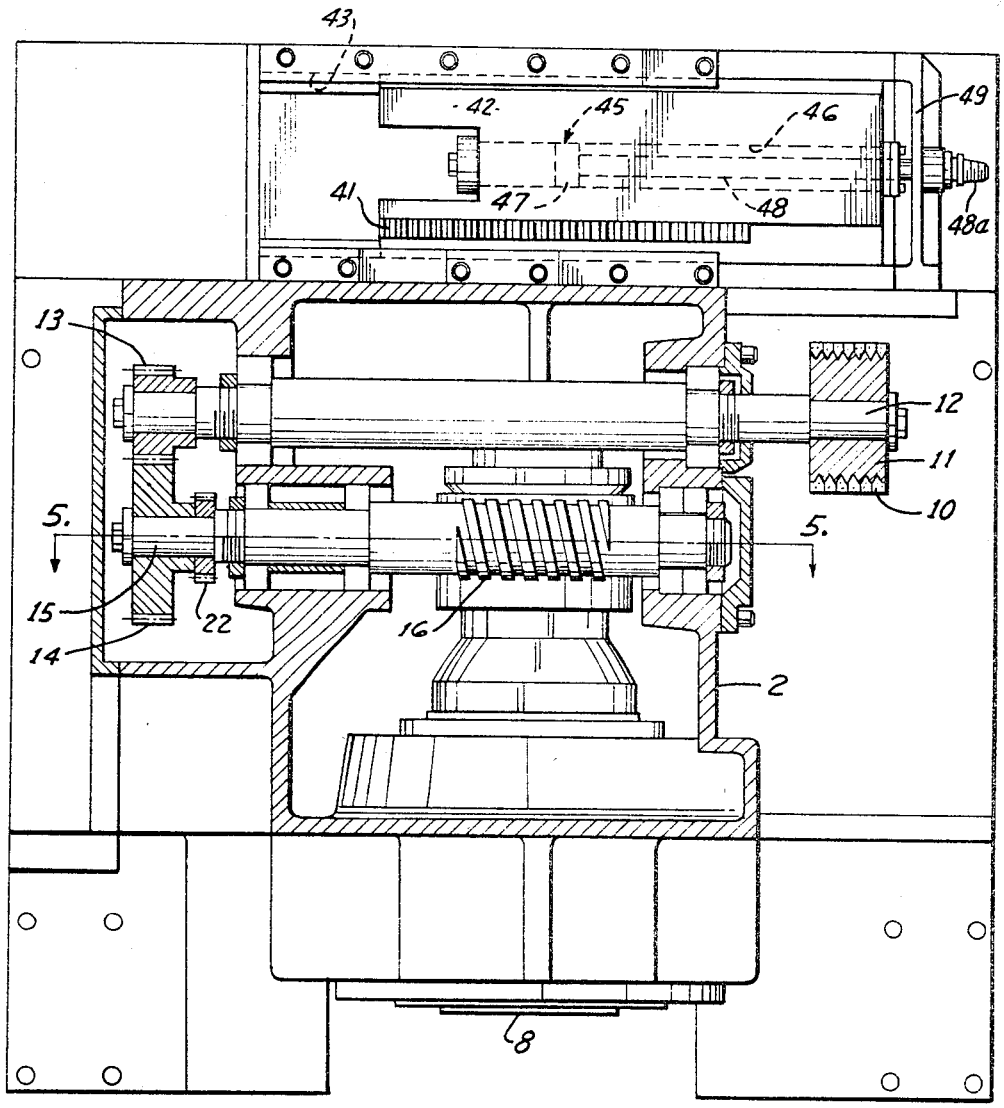
FIG. 4 is an enlarged fragmentary horizontal view taken on the line 4—4 in FIG. 3.
Figure 5:
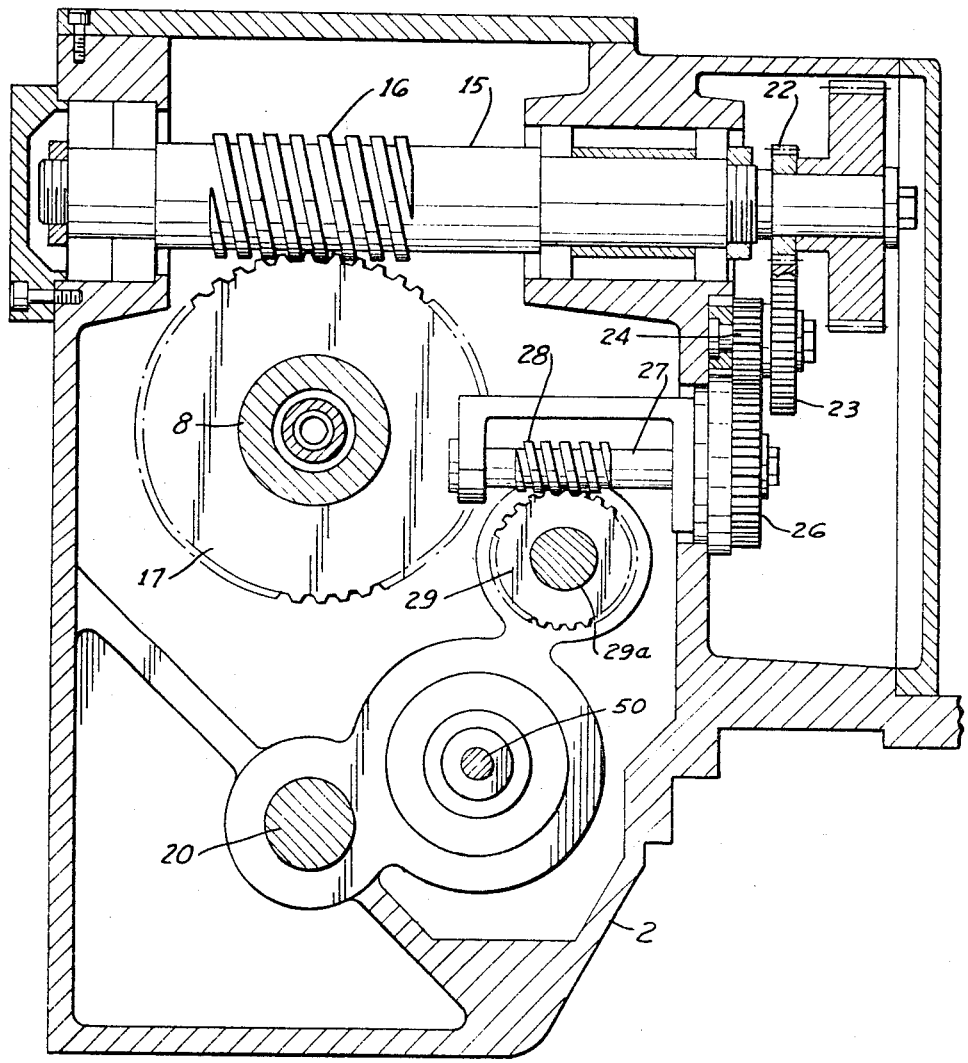
FIG. 5 is an enlarged vertical sectional view taken on the line 5—5 in FIG. 4.

Referring to the drawings, the machine comprises a frame 1 on which a threading mechanism, indicated generally at 2, is mounted for sliding movement endwise of the frame along slideways 3 toward and away from a supporting chuck 4. The chuck 4 preferably is of the roll-over type, such as described in my copending application, Serial No. 137,084 filed September 11, 1961, now Patent No. 3,083,024, issued March 26, 1963. The chuck includes a gripping head 5 which is mounted so as to be rotated 180° about horizontal trunnions 6 so as to present opposite ends of a length of pipe coupling 7 held therein successively toward a coaxial rotary spindle 8 of the machine. The mechanism is driven generally by a motor 9 which, through V-belts 10, drives a pulley 11 on a main driving shaft 12 of the spindle machine, as best illustrated in FIGS. 2 and 4.

The shaft 12 is mounted for rotation in suitable bearings in the housing of the mechanism 2 and is provided with a driving gear 13 which drives a gear 14 on a rotatable screw shaft 15. The screw shaft 15 is provided with a driving worm portion 16 which drives a worm gear 17 on and rotatable with the spindle 8. The spindle 8 carries the conventional cutting tools, as described in the above identified patent, and is continuously driven at a preselected speed.

In order to advance the mechanism 2 along the slideway 3 for advancing the spindle 8 axially, a suitable feed screw 20 is provided. This feed screw 20 is carried by the mechanism 2 for movement therewith along the slideway 3 and cooperates with a suitable follower 21 which is fixed on the frame 1. Consequently, rotation of the screw 20 in one direction advances the mechanism 2 and rotation in the opposite direction retracts the mechanism 2.

As mentioned heretofore, it is desirable to advance the mechanism 2 slowly in timed relation to the rotation of the spindle, and to return it rapidly. In order to advance the mechanism 2 in timed relation to the spindle, the shaft 15 is provided with a co-rotatable gear 22 which drives a gear 23. The gear 23 is connected in fixed coaxial relation to, and co-rotation with, a gear 24. The gear 24, in turn, drives a gear 26 which is co-rotatable with a worm shaft 27 on which is a worm 28. The worm 28 drives a gear 29 which rotates a shaft 29a on which is a gear 30. The gear 30 is co-rotatable with the shaft 29a and drives the feed screw on the feeding stroke in timed relation to the rotation of the spindle 8.

The gear 30 is arranged to drive the feed screw 20 through an auxiliary gear chain which includes a clutch 31. The clutch includes a driving clutch member 32 driven by the gear 30 and a driven clutch member 33. The member 32 has gear teeth 34 continuously in mesh with the gear 30 so that the member 32 is continuously driven by the gear 30. The member 33, in turn, has external gear teeth 35 which are continuously in mesh with a driven gear 36 which is mounted on, and co-rotatable with, the feed screw 20. The member 33 also carries external gear teeth 37 which are in mesh with a gear 38 on a jack shaft 39. The opposite end of the shaft 39 carries a gear 40 which is meshed with a rack 41.

The rack 41 is mounted on a fixed slide 42 which is mounted for movement transversely of the path of movement of mechanism 2 in a guideway 43 which is fixed in position on the mechanism 2.

The slide 42 carries a piston and cylinder assemblage 45 including a cylinder 46 in which is a reciprocable piston 47 having a piston rod 48. The rod 48 is fastened at one end to a fixed frame portion 49 of the mechanism 2. The piston rod 48 is hollow and has at its outer end a fitting 48a for connection to a suitable source of fluid pressure which may be continuously maintained thereon at sufficient pressure to return the mechanism 2 along the guideway 3 to starting position when the clutch 31 is disengaged.

Assuming the clutch 31 is connected, the lead screw 20 is continuously driven through the clutch in timed relation to the rotation of the spindle 8, and the rotation of the screw 20 in the follower 21 advances the spindle in the proper relation to the piece to be threaded. During this operation, the clutch also drives the gears 38 and 40 and thereby the rack 41 and slide 42 against the force of the fluid between the piston 47 and the head end of the cylinder 46. However, when the clutch 31 is disengaged, fluid pressure in the cylinder 46 at the head end of the piston returns the slide 42 to starting position, and, thereby, through the rack 41, gear 40, jack shaft 39, gear 38, and teeth 37 of the clutch member 33, rotates the clutch member 33 and thereby, through the gear 36, the feed screw 20 in the return direction.

This operation continues until the piston has reached the end of its stroke, whereby the mechanism 2 is retracted always to the exact starting position and remains in that position until the clutch is re-engaged.

However, during all this period, the spindle 8 is being continuously driven and changing its rotated position relative to the advanced position of the spindle 8 and rotated position of the feed screw 20. Consequently, it is necessary that the clutch 31 be re-engaged in exactly the same rotated position relative to the rotated position of the spindle 8 in which it is immediately preceding the disengagement of the clutch. For this purpose, the clutch illustrated in FIGS. 6 through 9, later to be described, is employed.

For operating the clutch, the clutch member 33 is rotatably mounted on a shaft 50. The shaft 50 is mounted in the frame of the mechanism 2 for sliding axially of the member 32 a sufficient distance to engage the member 33 with the member 32 in clutching relation. The gears 37 and 38 are of sufficient axial length relative to each other to remain in mesh during engagement and disengagement of the members 32 and 33.

Figure 3:
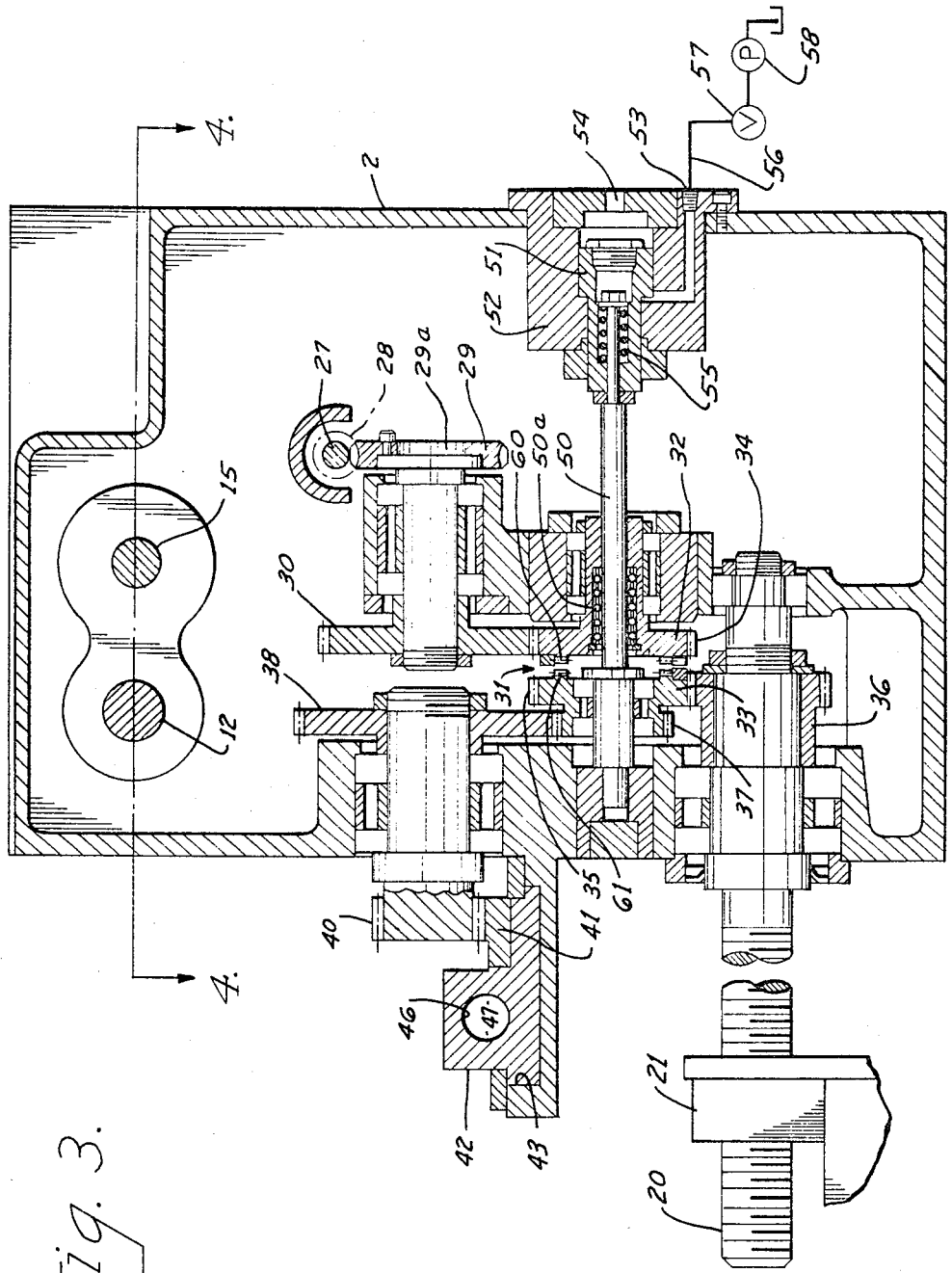
FIG. 3 is a fragmentary enlarged vertical sectional view taken on the line 3—3 in FIG. 2.

A set of caged ball bearings 50a are interposed between the shaft 50 and the axial bore in the member 32 and support the shaft for axial movement and rotative movement relative to the member 32. The shaft 50 is connected to a piston 51 which is reciprocable in a cylinder 52. Fluid can be admitted to the rod end of the piston through a suitable duct 53 from a conventional connection and control valve. The head end of the cylinder is vented, as indicated at 54. The shaft 50 is connected to the piston 51 for limited axial movement through the medium of a spring 55 so that, when the piston has traveled to the extreme right in FIG. 3, it urges the clutch member 33 into engagement and can hold it in engagement by the yieldable force of the spring 55 once engagement occurs. Thus the members can rotate while urged axially into contact while seeking the proper relatively rotated position with respect to each other. When air is vented from the duct 53, the spring 51 disengages the clutch members.

As shown, a pipe line 56 leads from the duct 53 through a suitable control valve 57 to a constant source 58 of compressed air, such as conventionally provided for chuck operation.

Each of the clutch members 32 and 33 is a multi-tooth clutch having a circumferential row of teeth extending continuously about its axis and arranged for engagement axially of the members. For example, the member 32 may have a row of teeth 60 and the member 33 a row of teeth 61, these teeth being arranged so that all concurrently engage and disengage for clutching and declutching, respectively.

As mentioned, it is desirable that the clutch members re-engage each other always in the same preselected rotated position relative to each other. In FIGS. 7 through 10, the direction of rotation of the clutch during driving is indicated by the arrow D. This does not occur merely because the clutch member 33 is always returned to exactly its predetermined rotated starting position, as also is the feed screw 20. Instead, the clutch member 32 in continuously driven in timed relation to the spindle and might be in any one of a number of rotated positions at the time of engagement. Accordingly, means are provided to assure that re-engagement of the teeth of the clutch members can occur only when the rotation of the clutch member 32 is such that the tool is in exactly the same rotated position about the axis of the spindle as it was at the beginning of the preceding threading operation.

For this purpose, a suitable hold-out means is provided. In the form illustrated, the member 32 has a peripherally radially extending flange portion 64 disposed radially outwardly from its row of clutch teeth and generally in a plane normal to the axis of the clutch member. Correspondingly, the clutch member 33 has a peripheral radially extending flange 65. The flanges have end faces presented toward each other axially of the members. Mounted on the flange 65 is a hold-out member 66, this member extending peripherally of the clutch member 33 and protruding outwardly from the plane of the flange 65 a distance such that it can engage the adjacent face of the flange 64 of the member 32 and slide therealong, under the pressure of the spring 55, as the clutch members 32 and 33 rotate relative to each other. The height of the hold-out 66 above the plane of the flange 65 is such that when it engages the adjacent face of the flange 64, the teeth of the clutch members are held out of engagement with each other a short distance axially of the clutch members. The flange 64 has a circumferentially extending slide face 64a and a recess 68 of limited extent peripherally of the clutch members, interrupting said face and so arranged that, when the hold-out 66 is aligned therewith in the direction of clutch engagement, the hold-out 66 can drop into the recess 68, thus releasing the clutch members for movement toward each other and allowing the clutch teeth to engage. With this arrangement, the teeth of one member must engage the same teeth of the other member each operation, regardless of the rotated position of the clutch member 32 at the time the piston 51 is operated to move the clutch member 33 toward clutching position.

Thus, while the members 32 and 33 are urged to engaging position, the hold-out 66 slides on the slide face 64a of the flange 64, being held lightly thereagainst by the spring 55, and the retracted piston 51. When, however, the clutch member 32 is rotated to a position in which the recess 68 is aligned with the hold-out 66, the hold-out drops thereinto allowing the teeth to mesh. It is to be noted that no driving is effected by the hold-out and release, but all driving is effected by the clutch teeth themselves.

In order to assure this, as illustrated in FIG. 10, the leading face of the hold-out, as indicated at 70, trails slightly behind the leading face 71 of the leading tooth adjacent to it. The trailing edge of the hold-out, indicated at 73, however, is a substantial distance in front of the trailing face 74 of the recess 68. The hold-out is somewhat less in length peripherally of the clutch than the recess 68. It is noted in FIG. 10 that the leading end of the hold-out projects in a direction toward the member 32 beyond the plane of the outer ends of the row of teeth 61 a distance of 0.015 to 0.020 inch. The outer face of the hold-out, indicated at 75, slopes, from its forward to its rearward edge, back toward the flange 65 so that the trailing edge of the face 75 lies in the plane of the end faces of the teeth 65. Also, the leading face of the hold-out is about .006 of an inch to the rear of the face 71. The reason for offsetting the leading edge of the hold-out toward the member 32 and rearwardly from the tooth face 71 is to assure that the hold-out will not engage and drive the clutch members if they happened to be stopped with the leading driving face 71 just beyond the leading driving face 76 of the member 32. In such instances, the hold-out cannot deeply engage because if the outermost margin of the face 70 as indicated at X in FIG. 10, can pass the outermost margin of the face 76, as indicated at Y in FIG. 10, the hold-out will be engaged at its forward margin X by the margin Y and cammed back out of relation, permitting another revolution to occur. This camming action occurs due to a slight relief of the outermost margins X and Y wherein the margin X of the front end 70 of the holdout member 66 is inclined slightly front to rear of the holdout in a direction toward the member 32, and the outermost margin Y of the end face 76 is inclined slightly from front to rear in the direction away from the member 33. Thus either the teeth remain engaged or the hold-out is released for another revolution. Only when the hold-out permits a clean drop into the recess 68 so the teeth fully engage does it remain in the recess 68. As a result each tooth engages precisely the tooth with which it was engaged before disengagement occurred. Thus, the same relative rotated positions of the two clutch members at the time of engagement is assured at all times, and since the assemblage 45, acting through the rack 41, always returns the feed screw 20 to the same axial and rotated positions, the cut of the next thread starts exactly at the same axial and rotated position as its predecessor.

It is to be noted that the teeth are provided with a slight relief on the forward faces which are to engage so as to assist in effective engagement. Further, each is provided with reliefs, endwise of the clutch members, beginning slightly to the rear of the forward faces so as to permit effective engagement.

Thus, it can be seen that no matter at what time the piston 51 is operated to engage the clutch members, it merely draws them into yielding contact under the force of the spring 55 with their clutch teeth unengaged, and they will so remain until the clutch member 32 has been rotated so that exactly the same teeth which had theretofore been engaged re-engage.

Since, as mentioned, the rotated position of the member 33 relative to the feed screw 20 and the starting position of the mechanism or carriage 2 is controlled by the rack 41 and its piston and cylinder assemblage 45, the advance of the spindle starts from the same position with the tool in the same rotated position.

As mentioned, a roll-over chuck 4 is provided for rolling the pipe coupling 7 end over end to present first one end and then the other to the spindle. The advance of the mechanism 2 is selected so as to cut a thread to the normal axial midpoint of the coupling from the starting position of the carriage 2. Thus, even though the coupling is not exactly centered axially of the coupling in the chuck 5, the threads will match at the juncture because the chaser moves to the same place from whichever end its starts. If the sleeve 7 is offset from center axially, a shorter or longer thread will be cut from the initial end, depending on the offset, but it will be compensated for by the lesser length of cut from the other end. However, at the juncture, the threads will merge and the cutter will not overrun. This is true even if tapered threads are required because the advance and retraction of the chasers toward the axis of the coupling will depend not on their distance in the coupling but on the amount of advance made by spindle head.

While I have described the clutch in connection with the cutting of screw threads, it is apparent from the description that it may be used in connection with other machines and for other purposes, the important feature being that the clutch can re-engage only at exactly the same teeth each time regardless of the relatively rotated positions of the two parts at the time they are urged toward each other for engagement. Further, the driving through the clutch is at all times directly through the teeth and at no time through the hold-out mechanism. Thus, it is the distance of the tool from the roll-over axis 6 of the chuck that is always fixed in the starting position, this being accomplished by the rack. The rotated position of the chaser, on the other hand, is determined by the clutch which assures that the chaser is in exactly the same rotated position when the mechanism 2 is in the starting position, and that for each point during the advance of the spindle 8, the rotated position of the chaser is what it was for that same advanced position of the mechanism during the preceding cutting operation.

Having thus described my invention, I claim:

A cutting tool and clutch combination comprising a frame, a tool mechanism mounted on the frame for movement along a predetermined path to an advanced operating position and to a retracted starting position, a tool head rotatably mounted on the mechanism, a feed screw for advancing the mechanism, power means for rotating the head, main transmission means for drivingly interconnecting the power means and feed screw for rotation of the feed screw in fixed timed relation to rotation of the head, said transmission means including a pilot clutch arranged to engage and render the transmission means active and to disengage and render the transmission means idle, selectively, relative to the feed screw, auxiliary power means operative to return the mechanism to its original starting position and to restore the feed screw to its original starting position when the clutch is disengaged and to hold the screw in said position while the clutch remains disengaged, said clutch comprising two clutch members having interengageable clutch teeth, one of said clutch members being rotatable by part of said main transmission means in fixed relation to the rotation of the head and being continuously driven while the head is rotated, the other clutch member being connectable through part of said main transmission means for rotation in fixed relation to the feed screw, and being connected to the auxiliary power means so as to cease rotation always in the same starting position when the feed screw is returned by the auxiliary power means to its starting position, means for disengaging the clutch members and for urging them toward engaging position, selectively, and complementary hold-out means on the members normally operative to prevent clutching engagement of the clutch members, but operative in one relatively rotated position to permit engagement of the same teeth with each other at each engagement.

References Cited by the Examiner

UNITED STATES PATENTS 2,822,072  2/1958  Goss _____ 192—67 X

ANDREW R. JUHASZ, *Primary Examiner.*